Sept. 6, 1966 P. P. W. VARLET 3,271,182
PROCESS FOR PRODUCING SHEETS OF REINFORCED POLYESTER RESIN
Filed Aug. 3, 1962
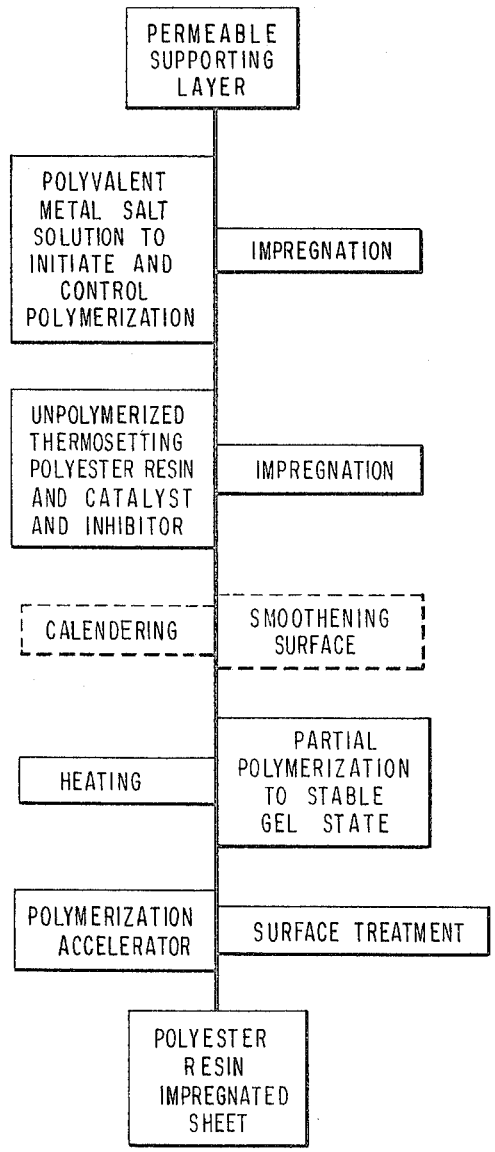
INVENTOR
PIERRE PAUL WILLIAM VARLET
BY
ATTORNEY

United States Patent Office 3,271,182
Patented Sept. 6, 1966

3,271,182
PROCESS FOR PRODUCING SHEETS OF REINFORCED POLYESTER RESIN
Pierre Paul William Varlet, Asnieres, France, assignor to Societe Anonyme des Usines Chausson, Asnieres, Seine, France, a corporation of France
Filed Aug. 3, 1962, Ser. No. 214,522
Claims priority, application France, Nov. 26, 1958, 780,144, Patent 1,223,346; Sept. 21, 1959, 805,633, Patent 76,338
15 Claims. (Cl. 117—47)

This application is a continuation-in-part of application Serial No. 853,989, filed November 19, 1959, now abandoned.

This invention relates to a novel method for the manufacture of reinforced plastic sheets and plates and to the products obtained thereby. More particularly, the invention concerns a method of preparing sheets and plates having smooth and nonadherent surfaces by impregnation of a layer of reinforcing material with a thermosetting type polyester resin followed by polymerization in situ.

In accordance with the invention, there is provided a novel industrial product in the form of reinforced plastic sheets or plates having a smooth and nonadherent surface, which can be shaped or stamped into any desired object, utilizing mechanical operations similar to those employed for shaping steel sheets or plates. These mechanical operations include, for example, the use of stamping machine or folding presses, which heretofore could not be successfully employed on synthetic resin sheets or plates.

The method of the invention comprises the steps of first impregnating a supporting layer of a permeable reinforcing material with a substance capable of initiating and then controlling the polymerization of the thermosetting polyester resin which forms the body of the plastic sheet or plate. Thereafter, the impregnated reinforcing material is further impregnated with the resin together with a polymerization catalyst therefor. The impregnated material is then heated to initiate polymerization, the resin going to a partially polymerized gel state induced by the action of the polymerization initiating and controlling substance originally provided. Finally complete polymerization is achieved by application of heat and pressure, under the action of the polymerization catalyst.

Numerous variations and supplemental procedures may be included with the basic method outlined above, as will become apparent as the description proceeds. The method of the invention affords the advantage of being able to be carried out at ambient temperature, and equally well either as a batch or continuous process.

The plastic sheets and plates obtained by the method of the invention possess smooth and nonadherent surfaces. They are of regular thickness and are adapted to meet accurate tolerances, regardless of the total thickness. They can be handled manually or automatically by the same equipment used in metal working plants. Moreover, their use eliminates long and difficult cleaning of tools used for shaping them, which cleaning was heretofore required in working with synthetic resin plates.

The invention has the further advantage that the sheets or plates can be prepared in a preliminary shaped form, stored until use, and then rapidly polymerized. This makes possible the mass production of parts, and the maintenance of rates of production and work cycles similar to those occurring in the stamping or shaping of metal sheets. The invention will be better understood by reference to the accompanying drawing of a flowsheet depicting the manufacture of reinforced polyester resin sheets capable of being shaped mechanically.

The first step in the method of the invention is the impregnation of a layer of permeable reinforcing material with the resin-forming ingredients. The permeable reinforcing material may comprise any suitable layer of natural or synthetic fiber or fabric, such as, for example, glass fiber, paper, synthetic resin fabric or fiber, cloth, asbestos, and the like. One or more layers may be employed for impregnation.

By bringing the impregnated resin to the gel state, the product is at that point obtained in a condition of great plasticity and can be subjected to distortions of large amplitude. Moreover, the plasticity of the gel can be easily regulated, providing a shape that can be considered a partial polymerization state, so that the final polymerization can then be brought about, when shaping, by an operation of extremely short duration.

The layer of permeable reinforcing material is impregnated with a solution of a polymerization controlling agent, by any suitable method, as by dipping, spraying or coating. The function of this impregnating solution is to start, then to slow down, and possibly to interrupt, the polymerization of the thermosetting resin which is added in the next step.

The impregnating solution comprises a solution of one or more metal salts in a polyhydric alcohol. The metal of the metal salt is advantageously a polyvalent metal, such as, for example, tin, iron, zinc, boron, cobalt, or manganese. The salt may be formed from either an inorganic acid or an organic acid. Inorganic salts include halides and sulfates. Examples of metal salts include nonhydrated stannous chloride, ferrous chloride, zinc sulfate and cobalt naphthenate. Examples of suitable polyhydric alcohols for use as solvents include ethylene glycol, diethylene glycol, propylene glycol, glycerol, butane-1,2-diol, and the like.

In order that the impregnation of the permeable material will be homogeneous, the impregnant is advantageously diluted in a volatile solvent, such as, for example, a lower aliphatic alcohol, preferably ethyl alcohol. When impregnation takes place by spraying, it will obviously be unnecessary to proceed with wringing, since it becomes possible to know with sufficient accuracy the weight of the impregnant sprayed per unit of surface of the permeable material.

After impregnation, the fibrous support is conveyed into a drying enclosure in which the support is moved continuously or intermittently, according to the kind of drying equipment available, and depending upon whether operation is intermittent or continuous.

The permeable material impregnated and dried as described can be used directly in the following stages of the process, or, if desired, they can be preserved for a fairly long period up to several hours or even several days, provided the impregnated material is kept free from access of moisture.

In an alternate version of the foregoing procedure, the polymerization controlling agent is not diluted with an alcohol, but instead there may be employed as a diluent a suitable monomeric substance, such as a vinyl monomer, for example, vinyl acetate. The quantity of diluent is sufficient to insure that all the fibers of the support are properly wetted. In this alternate procedure, drying is not employed, but the permeable material is kept damp by the monomer which is intended to facilitate in subsequent wetting by the thermosetting resin.

The second step of the method of the invention involves the preparation and application of a thermosetting type polyester resin, which is used for the impregnation of the support. The polyester resin is of the type which is capable of being put into a partially polymerized gel state and of maintaining this state.

The expression polyester resin signifies a class of thermosetting synthetic resins produced by the esterification of polybasic organic acids with polyhydric alcohols. The esterifying acids may be unsaturated, for example, maleic acid, or they may include acids such as phthalic acid or terephthalic acid, or other acids in addition to the polybasic acid.

Polyester resins which are capable of being put into a partially polymerized gel state, and which are suitable for use in the novel method of the invention, include those obtained by copolymerization of unsaturated alkyd resins, products of polycondensation of unsaturated dicarboxylic acids and cross-linked divalent alcohols with vinyl or allyl monomers, or the esters of allyl alcohol with cross-linked monobasic or polybasic acids with or without inclusion of vinyl monomers. This type of polyester resins includes those resulting from the polycondensation of two or more of the following acids and alcohols and comonomers:

| Acids | Alcohols | Comonomers |
|---|---|---|
| Maleic acid. | Ethylene glycol. | Styrene. |
| Maleic anhydride. | Diethylene glycol. | Acrylonitrile. |
| Adipic. | Propylene glycol. | Methylstyrene. |
| Sebacic. | Polypropylene glycol. | Methyl acrylate. |
| Fumaric. | Glycerol. | Methyl methacrylate. |
| Chlormaleic. | 1,2-butanediol. | Vinyl acetate. |
| Succinic. | 1,3-butanediol. | Esters of allyl alcohol, |
| Tetrachlorphthalic. | 1,4-butanediol. | e.g. phthalates, adi- |
| Lauric. | Trimethylolpropane. | pate, maleate, cya- |
| Caproic. | | nurate. |
| Ricinoleic. | | |
| Hexachlorendometh- | | |
| ylenetetrahydro- | | |
| phthalic. | | |
| Endomethylene-tetra- | | |
| hydrophthalic. | | |

Specific thermosetting polyester resin compositions which are suitable for use in the process of the invention are shown in the following formulations, which are to be regarded as illustrative, and not as limiting:

*Composition 1*

Unsaturated polyester resin obtained by baking together:

| | Moles |
|---|---|
| Ethylene glycol | 5 |
| Maleic anhydride | 2.5 |
| Adipic acid | 0.5 |
| Phthalic anhydride | 2 |

100 parts of the foregoing composition, after baking, may be incorporated with 35 parts of methylstyrene.

*Composition 2*

| | Moles |
|---|---|
| Ethylene glycol | 5 |
| Propylene glycol | 1 |
| Maleic acid | 3 |
| Phthalic anhydride | 2 |

100 parts of the foregoing composition, after baking are incorporated with, for example, 33 parts of styrene.

*Composition 3*

| | Moles |
|---|---|
| Ethylene glycol | 4 |
| Propylene glycol | 1 |
| Maleic acid | 3 |
| Phthalic anhydride | 1.8 |
| Lauric acid | 0.2 |

The lauric acid is added at the end of the baking process. 100 parts of the foregoing mixture may be incorporated with 33 parts of styrene.

The polyester resin with which the permeable layer is impregnated contains any suitable type of polymerization catalyst for this class of resin, preferably an oxidizing or free radical type catalyst, such as, for example, a peroxide type catalyst, such as benzoyl peroxide. The resin may also have incorporated therein suitable fillers, pigments, ann the like.

The purpose of the polymerization catalyst is to cause completion of the polymerization of the resin in the final stage of the process, and the catalyst is generally one which will have no activity or a negligible activity in connection with the first change of state of the resin, although it may exhibit a slight activity. The catalyst is intended to facilitate the polymerization of the resin at the final working of the sheet or plate.

In order to provide better control, there may be added to the resin, in addition to the polymerization catalyst, a polymerization inhibiting agent to act as a preservation agent or protector for the sheets or plates in which the resin is in the partially polymerized stage. Examples of suitable polymerization inhibiting agents are alkylated phenols, such as, 4-methyl-2,6-di-tertiary-butylphenol or dibutyl-teritiary-p-cresol. These may be applied in the form of a solution in an organic diluent, for example, a 6% solution in styrene.

It has also been found advantageous in certain cases to add a small amount of a polymerization moderating agent to the resin itself, for example, a combination of metal salt and ethylene glycol similar to that employed for the impregnation of the permeable layer. The amount employed for this purpose is relatively small, so that the resin can be kept stable for many hours at ambient temperature in the form of a coagulum. In this way, a large quantity of the resin can be prepared for use, making it possible to operate the process continuously, for the resin will not undergo substantially molecular modification so long as it is not used for impregnation as described.

The impregnation of the treated permeable layer can be carried out by means of rollers, doctor blades, spraying, or with suitable presses. The sheet can also be calendered to any desired thickness. The sheet may be subjected to any desired surface treatment to modify its surface structure, so that one or both faces of the sheet are smooth and nonadhesive.

In accordance with another embodiment of the invention, the sheet impregnated as described above, is subjected on at least one of its faces to the action of a polymerization accelerator. The polymerization accelerator may be, for example, an organic nitrogen compound such as an amine or an amide or an isocyanate. Examples of suitable accelerators include mono- or dialkylanilines, such as methyl or dimethylaniline, diarylguanidines, such as N,N'-diphenylguanidine, arylene di-isocyanates, such as toluene di-isocyanate, and the like. The foregoing polymerization accelerators, taken alone or in combination, are used in such a manner that they act only superficially and do not penetrate into the mass of the sheet.

It has been found advantageous to use the polymerization accelerators in admixture with a lubricating agent, such as a natural or synthetic wax, stearamide, polyethylene wax, hydrogenated castor oil, and the like. The lubricants are advantageously used in admixture with mono- or dialkylphosphates or a mixture thereof, for example, ethyl phosphate and diethyl phosphate. The phosphate esters act as diluents and aid in forming a lubricating and mold releasing agent which is especially effective. To obtain the desired result, the accelerator solution is contacted with the plastic sheet by spraying or by coating by means of an impregnated felt passing over an endless belt or a roller with which the resin sheet is brought into contact.

As mentioned previously, the sheets prepared as described can be preserved and the various agents allowed to act thereon without carrying out the other operations. Actually, when the resin is applied to the permeable support which has undergone its initial impregnation by the polymerization control agents, there exists a certain chain reaction which has the effect, after a certain period of time, of bringing about a transformation of the resin to assume the consistency of a very viscous gel which, after changing state, remains stable for a very long time, but which can be polymerized in a very short time by the action of heat or other means.

When the sheet is subjected to the surface treatment described above, the sticky character of the surface disappears and the gel state is no longer perceptible, for the sheet surface attains an intermediate stage between the gel state and the state of complete polymerization. This intermediate stage can be regulated by regulating the amount of the substances used for treating the surfaces.

The transformation of the resin to complete polymerization can be regulated and accelerated by submitting the prepared sheet to a heat treatment. For this purpose, the prepared sheets or plates are advantageously heated to a temperature not in excess of about 120° C., preferably about 100° C., but the temperature is not critical. The sheets are maintained at this temperature for a period of time which depends on the desired thickness and rigidity of the gel, as well as upon the hardness of the skin that is formed on the surface of the sheets.

After heating, the sheet is cooled to stabilize the gel formed by the resin. Sheets treated in this way can be stored by placing them one on top of the other without the necessity of providing interlayers.

It has proved possible to store the sheets for several weeks prior to use, and the sheets can be handled and processed in a manner similar to that used for steel sheets, i.e. by employing stamping and shaping operations preferably carried with heating tools, so that complete polymerization of the sheets may take place while they are being worked. By employing such heating tools, it was possible to shape sheets by stamping whereby complete polymerization took place in less than 20 seconds.

Alternately, the sheets impregnated with resin are subjected to baking as described above, so as to obtain rapid transformation of the resin into gel form. The gel sheets are then subjected to a second heat treatment for a limited time, so that the heat will affect only the surface of the gelled sheet, thereby obtaining a superficial polymerization which is then stopped by cooling, thus enabling a nonadherent skin to be formed on the surface of the sheet without the use of chemical polymerizing agents.

The following example, which is to be regarded as illustrative and not as limiting, describes the operation of the process:

EXAMPLE

A glass fiber support having a surface of 1 sq. meter was employed as the permeable base. The support weighed 320 grams. The initial impregnation of this support was performed by dipping in 180 grams of a solution prepared by admixing 1000 cc. of ethyl alcohol and a 25% solution of melted stannous chloride by weight in 10 cc. of ethylene glycol. The impregnated support was then dried completely to eliminate the alcohol solvent by passing the support through a hot air tunnel at a speed of 1 meter per minute, the temperature being 100° C.

The support was then impregnated by applying thereto 350 grams of a polyester resin preparation having the following composition:

The polyester resin designated Composition 1,
  above _____grams__ 100
Calcium carbonate filler _____do____ 30
Benzoyl peroxide _____do____ 2
6% solution of 4-methyl-2,6-ditertiarybutyl-phenol
  in styrene _____cc__ 1
25% by wt. solution of stannous chloride $SnCl_2$ in
  ethylene glycol _____cc____ 0.4

The impregnated sheet was then calendered, and then spray coated with a mixture of 2% of dimethylaniline and 98% diethyl phosphate. The sheet was then placed between two metal plates heated to a temperature of 70° C. exerting a pressure of 100 g. per sq. cm. Baking time was 2½ hours. After withdrawal, the sheet was cooled to 30° C. with a blower.

It was found that in certain cases, the surface condition of the sheet was improved by substituting for the dimethylaniline a mixture of various polymerization accelerators, and especially a mixture of dimethylaniline, N,N'-diphenylguanidine and toluene di-isocyanate, in approximately equal quantities.

As will be seen from the foregoing, the invention provides a method for the preparation either of supports pre-impregnated with polymerization control agents subsequently serving to cause rapid gelling of the polyester resin, or of preparing the polyester resin with a catalyst and with or without the addition of more control agent starting formation of the gel, the latter addition, if made, being in an amount sufficiently small so that the prepared resin remains stable for a relatively long period of time, so that it need not be used at once.

In accordance with another aspect of the invention, the surfaces of the sheets may be rendered not only nonadhesive, but also self-lubricating so as to facilitate the subsequent shaping operations, such as press stamping, to which they are subjected. The surface treatment involves depositing over the entire surface of the prepared sheets a mixture of a wax and the aforementioned polymerization accelerator. For example, such a mixture can include incorporating in a natural or synthetic wax, such as stearamide, polyethylene wax, hydrogenated castor oil, or paraffin, of the accelerator. Thus a suitable mixture is 90 parts by weight of stearamide and 10 parts by weight of dimethylaniline, which can be made in the form of a block.

The wax impregnated with the polymerization accelerator may be applied by a compressed air spray gun, or in several other ways. Thus, when the sheets of resin are made continuously, they are normally made to pass between rollers or belts so that they acquire uniform thickness. These rollers or belts are heated to a suitable temperature so that prepolymerization takes place which transforms the resin into a gel, and it is advantageous that the wax blocks containing the polymerization accelerator are placed in contact with one of the calendering rollers or belts, so that the roller or belt is covered with a thin film of impregnated wax which is thus deposited in an extremely thin coat on the surface of the plastic sheets in the course of manufacture.

As the wax is generally not absorbed by the resin, it remains on the sheet surface and forms a particularly efficient lubricant for the tools used in shaping the sheets, and, moreover, the wax prevents any risk of sheet adhesion when the sheets are stacked for storage.

It is also within contemplation of the invention to include color pigments and other fillers in the resin, and to deposit other coatings, as for example, by electrolytic means.

What is claimed is:

1. Process for the manufacture of reinforced polyester resin sheets capable of being shaped mechanically, which comprises the steps of first impregnating a supporting layer of a permeable reinforcing material with a solution in a diluent selected from the group consisting of a polyhydric alcohol and a vinyl monomer, of a polyvalent metal salt soluble in said diluent, said polyvalent metal being selected from the group consisting of tin, iron, zinc, boron, cobalt and manganese, said salt being capable of initiating and then controlling the polymerization of said polyester resin upon heating below a predetermined temperature, then impregnating said impregnated reinforcing material with a mixture of an unpolymerized thermosetting polyester resin and a polymerization catalyst therefor not substantially activated by said predetermined temperature and a sufficient amount of an alkylated phenol to inhibit polymerization, then heating said impregnated material to a temperature within the limit of said predetermined temperature to initiate polymerization and to cause said resin to go to a partially polymerized and stable gel state by the action of said polymerization initiating and controlling salt.

2. The process of claim 1 in which the impregnated material containing the resin in the gel state is further subjected to heat and pressure to cause complete polymerization.

3. The process of claim 1 in which the supporting layer is first impregnated with a solution of a polyvalent metal salt, in a vinyl monomer diluent.

4. The process of claim 3 in which the vinyl monomer is vinyl acetate.

5. Process for the manufacture of reinforced polyester resin sheets capable of being shaped mechanically, which comprises the steps of first impregnating a supporting layer of a permeable reinforcing material with a solution in a polyhydric alcohol of a polyvalent metal salt solution therein, said polyvalent metal being selected from the group consisting of tin, iron, zinc, boron, cobalt and manganese, said salt being capable of initiating and then controlling the polymerization of said polyester resin upon heating below a predetermined temperature, drying, further impregnating said impregnated reinforcing material with a mixture of an unpolymerized thermosetting polyester resin and a polymerization catalyst therefor not substantially activated by said predetermined temperature and a sufficient amount of an alkylated phenol to inhibit polymerization, calendering said reinforcing layer to impart a smooth and nonadherent surface thereto, heating under pressure to a temperature within the limit of said predetermined temperature to initiate polymerization and to caues said resin to go to a partially polymerized and stable gel state by the action of said polymerization initiating and controlling salt.

6. The process of claim 5 in which the impregnated material containing the resin in the gel state is further subjected to heat and pressure to produce complete polymerization.

7. The process of claim 5 in which the polyvalent metal salt is stannous chloride.

8. The process of claim 5 in which the polyhydric alcohol is ethylene glycol.

9. The process of claim 5 in which the supporting layer is first impregnated with a solution of stannous chloride, ethylene glycol, and ethyl alcohol.

10. The process of claim 5 in which the supporting layer is first impregnated with a solution of a polyvalent metal salt, a polyhydric alcohol, and a volatile solvent.

11. The process of claim 5 in which the inhibiting agent is a solution of an alkylated phenol in styrene.

12. Process for the manufacture of reinforced polyester resin sheets capable of being shaped mechanically, which comprises the steps of first impregnating a supporting layer of a permeable reinforcing material with a solution in a polyhydric alcohol of a polyvalent metal salt soluble therein, said polyvalent metal being selected from the group consisting of tin, iron, zinc, boron, cobalt and manganese, said salt being capable of initiating and then controlling the polymerization of said polyester resin upon heating below a predetermined temperature, drying, further impregnating said impregnated reinforcing material with a mixture of an unpolymerized thermosetting polyester resin and a polymerization catalyst therefor not substantially activated by said predetermined temperature and a sufficient amount of an alkylated phenol to inhibit polymerization, heating said impregnated material under pressure to a temperature within the limit of said predetermined temperature to initiate polymerization and to bring said polyester resin to a partially polymerized and stable gel state, and applying to at least one surface a polymerization accelerator selected from the group consisting of an alkylaniline, a dialkylaniline, a diarylguanidine, and an arylene di-isocyanate, to produce formation of a thin more fully polymerized surface layer upon further heating of the sheet.

13. The process of claim 12 in which the accelerator is dimethylaniline.

14. The process of claim 12 in which the polymerization accelerator aiding in the production of the thin polymerized surface is applied in combination with a lubricant to form a layer having a lubricating action.

15. The process of claim 14 in which the lubricant is a mixture of monoalkyl and dialkyl phosphates.

References Cited by the Examiner

UNITED STATES PATENTS

| | | | |
|---|---|---|---|
| 2,654,717 | 10/1953 | Rehberg | 117—124 |
| 2,908,602 | 10/1959 | Collardeau | 117—72 X |
| 2,931,739 | 4/1960 | Marzocchi | 117—126 |
| 2,967,117 | 1/1961 | Arledter | 117—126 |
| 2,978,354 | 4/1961 | Lesser | 117—72 X |
| 3,009,824 | 11/1961 | Boynton | 117—104 X |
| 3,010,929 | 11/1961 | Jones. | |
| 3,051,585 | 8/1962 | Weinberg | 117—72 X |
| 3,097,963 | 7/1963 | Caroselli | 117—126 |
| 3,159,500 | 12/1964 | Dowling | 117—47 X |

FOREIGN PATENTS 1,025,302    2/1958    Germany.

RICHARD D. NEVIUS, *Primary Examiner.*

JOSEPH B. SPENCER, *Examiner.*

A. GOLIAN, *Assistant Examiner.*